United States Patent
Ishida et al.

(10) Patent No.: US 10,700,366 B2
(45) Date of Patent: Jun. 30, 2020

(54) FUEL CELL HAVING A METAL SEPARATOR WITH A FLAT PORTION

(71) Applicant: HONDA MOTOR CO., LTD., Tokyo (JP)

(72) Inventors: Kentaro Ishida, Wako (JP); Yoshihito Kimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 626 days.

(21) Appl. No.: 14/875,696

(22) Filed: Oct. 6, 2015

(65) Prior Publication Data

US 2016/0099475 A1   Apr. 7, 2016

(30) Foreign Application Priority Data

Oct. 7, 2014   (JP) .................. 2014-206045

(51) Int. Cl.
*H01M 8/02* (2016.01)
*H01M 8/0273* (2016.01)
(Continued)

(52) U.S. Cl.
CPC ....... *H01M 8/0273* (2013.01); *H01M 8/0206* (2013.01); *H01M 8/0258* (2013.01);
(Continued)

(58) Field of Classification Search
None
See application file for complete search history.

(56) References Cited

U.S. PATENT DOCUMENTS

2002/0192532 A1* 12/2002 Inagaki ............... H01M 8/0206
429/492
2003/0129474 A1   7/2003 Kikuchi et al.
(Continued)

FOREIGN PATENT DOCUMENTS

JP   2000-012053   4/2000
JP   2000-133289   5/2000
(Continued)

OTHER PUBLICATIONS

Japanese Office Action for corresponding JP Application No. 2014-206045, dated Jan. 31, 2017 (w/ English machine translation).

*Primary Examiner* — Ula C Ruddock
*Assistant Examiner* — Tony S Chuo
(74) *Attorney, Agent, or Firm* — Mori & Ward, LLP

(57) ABSTRACT

A fuel cell includes a membrane electrode assembly and a metal separator. The membrane electrode assembly includes an electrolyte membrane, first and second electrodes, and a resin frame member. The resin frame member is provided on an outer peripheral portion of the membrane electrode assembly. The metal separator is stacked on the membrane electrode assembly in a stacking direction and includes a reactant gas channel, a reactant gas manifold, and a flat portion. The resin frame member of the membrane electrode assembly has an outer shape to be disposed further inward than the reactant gas manifold and includes a connection channel portion that is disposed outward from an electrode surface and that connects the reactant gas manifold and the reactant gas channel to each other. The flat portion is provided in contact with the connection channel portion.

15 Claims, 11 Drawing Sheets

(51) Int. Cl.
*H01M 8/0258* (2016.01)
*H01M 8/0206* (2016.01)
*H01M 8/242* (2016.01)
*H01M 8/1018* (2016.01)

(52) U.S. Cl.
CPC .... *H01M 8/242* (2013.01); *H01M 2008/1095* (2013.01); *H01M 2250/20* (2013.01); *Y02P 70/56* (2015.11); *Y02T 90/32* (2013.01)

(56) References Cited

U.S. PATENT DOCUMENTS

| | | | |
|---|---|---|---|
| 2005/0255367 A1* | 11/2005 | Takahashi | H01M 8/0265 |
| | | | 429/434 |
| 2006/0110651 A1 | 5/2006 | Wakahoi et al. | |
| 2007/0020504 A1 | 1/2007 | Sugita et al. | |
| 2014/0287338 A1* | 9/2014 | Tanaka | H01M 8/1004 |
| | | | 429/481 |
| 2015/0072265 A1 | 3/2015 | Ishida et al. | |

FOREIGN PATENT DOCUMENTS

| | | | | |
|---|---|---|---|---|
| JP | 2010-027381 | | 2/2010 | |
| JP | 2011-028939 | * | 2/2011 | H01M 8/02 |
| JP | 4634933 B2 | | 2/2011 | |
| WO | WO 2013/140855 | | 9/2013 | |

\* cited by examiner

US 10,700,366 B2

FUEL CELL HAVING A METAL SEPARATOR WITH A FLAT PORTION

CROSS-REFERENCE TO RELATED APPLICATIONS

The present application claims priority under 35 U.S.C. § 119 to Japanese Patent Application No. 2014-206045, filed Oct. 7, 2014, entitled "Fuel Cell." The contents of this application are incorporated herein by reference in their entirety.

BACKGROUND

1. Field

The present disclosure relates to a fuel cell.

2. Description of the Related Art

For example, a solid polymer electrolyte fuel cell includes a membrane electrode assembly (MEA), in which an anode electrode is disposed on one side of a solid-polymer electrolyte membrane and a cathode electrode is disposed on the other side of the solid-polymer electrolyte membrane. The solid-polymer electrolyte membrane is made from a polymer ion-exchange membrane. The MEA and a pair of separators, sandwiching the MEA therebetween, constitute a power generation cell (unit cell). Several tens to several hundreds of such power generation cells are stacked and used, for example, as a vehicle fuel cell stack.

Typically, a fuel cell has a so-called internal manifold structure for supplying a fuel gas and an oxidant gas, each of which is a reactant gas, respectively to anode electrodes and cathode electrodes of power generation cells that are stacked.

The internal manifold structure includes a reactant gas inlet manifold (fuel gas inlet manifold, oxidant gas inlet manifold) and a reactant gas outlet manifold (fuel gas outlet manifold, oxidant gas outlet manifold), each extending through the power generation cells in a stacking direction in which the power generation cells are stacked. The reactant gas inlet manifold is connected to an inlet of a reactant gas channel (fuel gas channel, oxidant gas channel), which supplies a reactant gas along an electrode surface; and the reactant gas outlet manifold is connected to an outlet of the reactant gas channel.

In this case, the reactant gas channel is connected to each of the reactant gas inlet manifold and reactant gas outlet manifold through a connection channel, which has parallel grooves or the like through which the reactant gas can flow smoothly and uniformly. Regarding such a structure, Japanese Patent No. 4634933, for example, describes a fuel cell that is devised to achieve a desirable sealing ability with an economical and simple structure.

In this fuel cell, a separator has a connection channel that connects a reactant gas manifold and a reactant gas channel to each other. At least one of gas diffusion layers of a membrane electrode assembly has a superposed portion that seals the connection channel by being superposed on the connection channel and pressed against the separator.

SUMMARY

According to one aspect of the present invention, a fuel cell includes a membrane electrode assembly and a metal separator. The membrane electrode assembly includes an electrolyte membrane and a pair of electrodes sandwiching the electrolyte membrane therebetween. The metal separator are stacked on the membrane electrode assembly. The metal separator includes a reactant gas channel through which a reactant gas is supplied along an electrode surface and a reactant gas manifold through which the reactant gas flows in a stacking direction in which the membrane electrode assembly and the metal separator are stacked. The membrane electrode assembly includes a resin frame member on an outer peripheral portion thereof. The resin frame member has an outer shape such that the resin frame member is disposed further inward than the reactant gas manifold. The resin frame member includes a connection channel portion that is disposed outward from the electrode surface and that connects the reactant gas manifold and the reactant gas channel to each other. The metal separator includes a flat portion that is in contact with the connection channel portion.

According to another aspect of the present invention, a fuel cell includes a membrane electrode assembly and a metal separator. The membrane electrode assembly includes an electrolyte membrane, first and second electrodes, and a resin frame member. The first and second electrodes sandwich the electrolyte membrane between the first and second electrodes. The resin frame member is provided on an outer peripheral portion of the membrane electrode assembly. The metal separator is stacked on the membrane electrode assembly in a stacking direction and includes a reactant gas channel, a reactant gas manifold, and a flat portion. A reactant gas is supplied through the reactant gas channel along an electrode surface of the membrane electrode assembly. The reactant gas flows through the reactant gas manifold in the stacking direction. The resin frame member of the membrane electrode assembly has an outer shape to be disposed further inward than the reactant gas manifold and includes a connection channel portion that is disposed outward from the electrode surface and that connects the reactant gas manifold and the reactant gas channel to each other. The flat portion is provided in contact with the connection channel portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
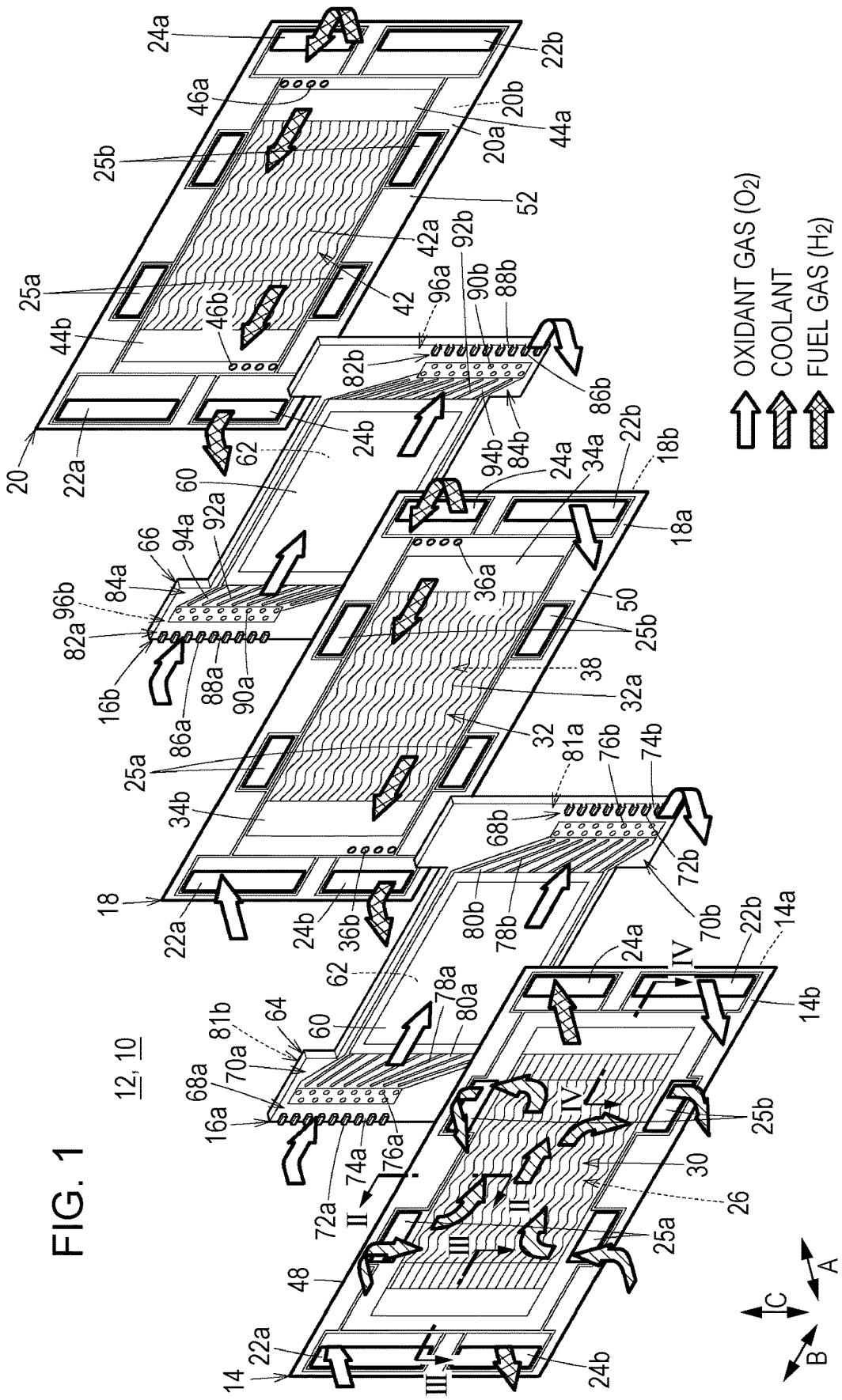
FIG. 1 is an exploded partial perspective view of a power generation unit of a fuel cell according to an embodiment of the present disclosure.

The embodiments will now be described with reference to the accompanying drawings, wherein like reference numerals designate corresponding or identical elements throughout the various drawings.

Referring to FIGS. 1 to 5, a fuel cell 10 according to an embodiment of the present disclosure includes a plurality of power generation units 12. The power generation units 12 are stacked on top of each other in a horizontal direction (direction of arrow A) or in a vertical direction (direction of arrow C). The fuel cell 10 is used, for example, as a fuel cell stack mounted in a fuel cell electric vehicle.

Each of the power generation units 12 includes a first metal separator 14, a first membrane electrode assembly 16a (MEA), a second metal separator 18, a second membrane electrode assembly 16b (MEA), and a third metal separator 20. The outer size of the first membrane electrode assembly 16a is larger than that of the second membrane electrode assembly 16b (see FIGS. 3 and 4).

Each of the first metal separator 14, the second metal separator 18, and the third metal separator 20 is a rectangular metal plate that is, for example, a steel plate, a stainless steel plate, an aluminum plate, a galvanized steel plate, or any of these metal plates having an anticorrosive coating on the surface thereof. Each of the first metal separator 14, the second metal separator 18, and the third metal separator 20, which has a rectangular shape in plan view, is made by press-forming a thin metal plate so as to have a corrugated cross section (see FIGS. 1 and 2).

Referring to FIG. 1, an oxidant gas inlet manifold 22a and a fuel gas outlet manifold 24b are formed in the power generation unit 12 so as to extend in the direction of arrow A through one end portion of the power generation unit 12 in the longitudinal direction (the direction of arrow B). To be specific, the oxidant gas inlet manifold 22a and the fuel gas outlet manifold 24b are formed in one end portion of each of the first metal separator 14, the second metal separator 18, and the third metal separator 20 in the longitudinal direction. An oxidant gas, such as an oxygen-containing gas, is supplied through the oxidant gas inlet manifold 22a. A fuel gas, such as a hydrogen-containing gas, is discharged through the fuel gas outlet manifold 24b.

A fuel gas inlet manifold 24a and an oxidant gas outlet manifold 22b are formed in the power generation unit 12 so as to extend in the direction of arrow A through the other end portion of the power generation unit 12 in the longitudinal direction (the direction of arrow B). The fuel gas is supplied through the fuel gas inlet manifold 24a. The oxidant gas is discharged through the oxidant gas outlet manifold 22b. To be specific, the fuel gas inlet manifold 24a and the oxidant gas outlet manifold 22b are formed in the other end portion of each of the first metal separator 14, the second metal separator 18, and the third metal separator 20 in the longitudinal direction.

A pair of upper and lower coolant inlet manifolds 25a are formed in the power generation unit 12 so as to extend in the direction of arrow A respectively through upper and lower end portions, near the oxidant gas inlet manifold 22a, of the power generation unit 12 in the transversal direction (direction of arrow C). A coolant is supplied through the pair of coolant inlet manifolds 25a. A pair of upper and lower coolant outlet manifolds 25b are formed in the power generation unit 12 so as to extend respectively through upper and lower end portions, near the fuel gas inlet manifold 24a, of the power generation unit 12 in the transversal direction. The coolant is discharged through the pair of coolant outlet manifolds 25b.

Figure 6:
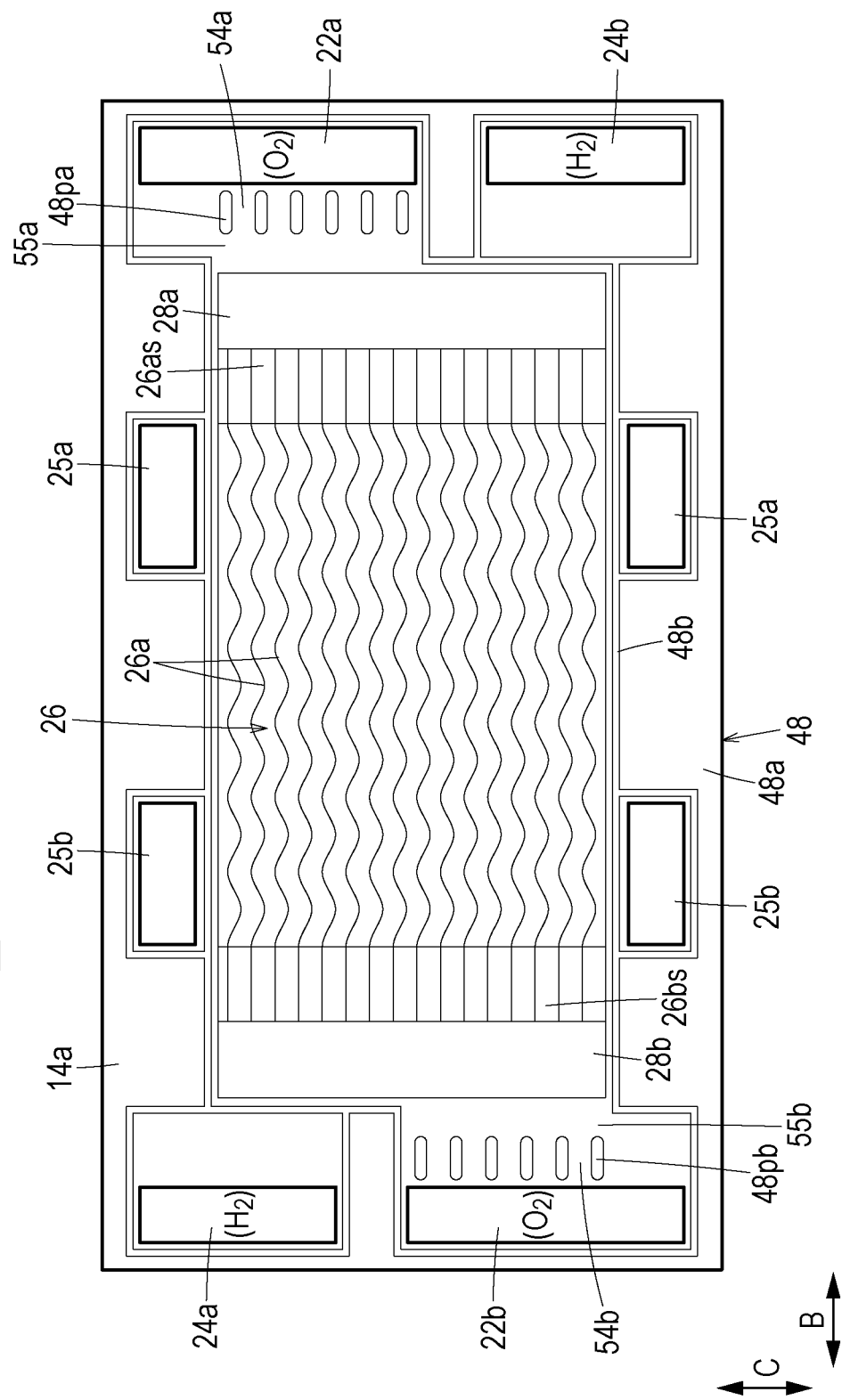
FIG. 6 is a plan view of a first metal separator of the power generation unit.

Referring to FIG. 6, a first oxidant gas channel 26, through which the oxidant gas inlet manifold 22a is connected to the oxidant gas outlet manifold 22b, is formed on a surface 14a of the first metal separator 14 facing the first membrane electrode assembly 16a.

The first oxidant gas channel 26 includes a plurality of wave-shaped channel grooves 26a (or linear channel grooves) that extend in the direction of arrow B. Linear channel grooves 26as and linear channel grooves 26bs are respectively formed at an inlet end and at an outlet end of the first oxidant gas channel 26. A planar first buffer contact portion 28a, which is in contact with an inlet buffer portion 70a described below, is disposed outward from the linear channel groove 26as. A planar second buffer contact portion 28b, which is in contact with an outlet buffer portion 70b described below, is disposed outward from the linear channel groove 26bs.

Referring to FIG. 1, a part of a coolant channel 30, through which the pair of coolant inlet manifolds 25a are connected to the pair of coolant outlet manifolds 25b, is formed on a surface 14b of the first metal separator 14. The coolant channel 30 is formed between the back side of the first oxidant gas channel 26 formed on the first metal separator 14 and the back side of a second fuel gas channel 42 formed on the third metal separator 20.

A first fuel gas channel 32, through which the fuel gas inlet manifold 24a is connected to the fuel gas outlet manifold 24b, is formed on a surface 18a of the second metal separator 18 facing the first membrane electrode assembly 16a. The first fuel gas channel 32 includes a plurality of wave-shaped channel grooves 32a (or linear channel grooves) that extend in the direction of arrow B.

A planar first buffer contact portion 34a, which is in contact with an inlet buffer portion 81a described below, is disposed at an inlet end of the first fuel gas channel 32. A planar second buffer contact portion 34b, which is in contact with an outlet buffer portion 81b described below, is disposed at an outlet end of the first fuel gas channel 32. In the first buffer contact portion 34a, a plurality of supply holes 36a are formed in the vicinity of the fuel gas inlet manifold 24a. In the second buffer contact portion 34b, a plurality of discharge holes 36b are formed in the vicinity of the fuel gas outlet manifold 24b.

Figure 7:
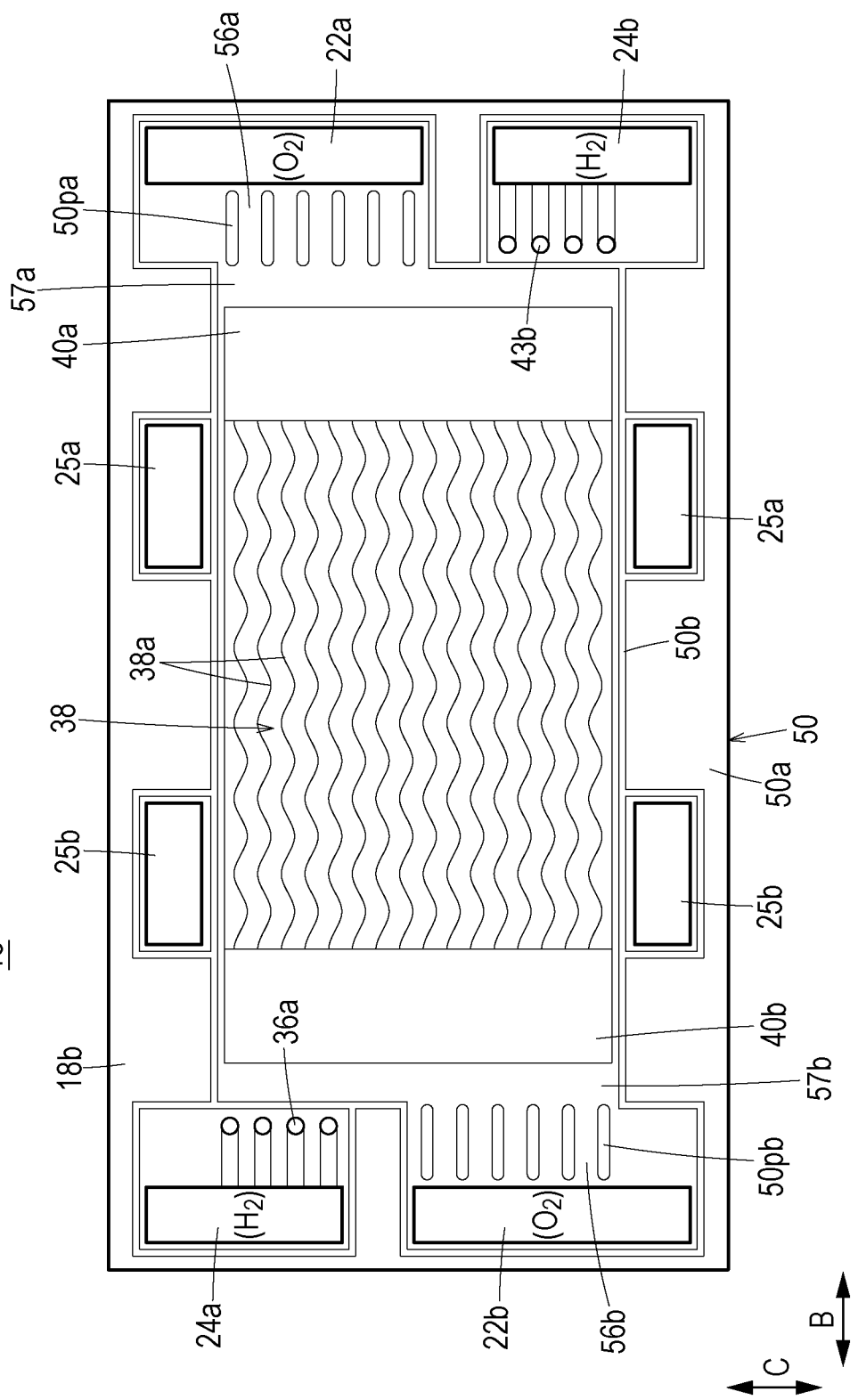
FIG. 7 is a plan view of a second metal separator of the power generation unit.

Referring to FIGS. 1 and 7, a second oxidant gas channel 38, through which the oxidant gas inlet manifold 22a is connected to the oxidant gas outlet manifold 22b, is formed on a surface 18b of the second metal separator 18 facing the second membrane electrode assembly 16b. The second oxidant gas channel 38 includes a plurality of wave-shaped channel grooves 38a (or linear channel grooves) that extend in the direction of arrow B.

A planar first buffer contact portion 40a, which is in contact with an inlet buffer portion 84a described below, is disposed at an inlet end of the second oxidant gas channel 38. A planar first buffer contact portion 40b, which is in contact with an outlet buffer portion 84b described below, is disposed at an outlet end of the second oxidant gas channel 38.

Referring to FIG. 1, the second fuel gas channel 42, through which the fuel gas inlet manifold 24a is connected to the fuel gas outlet manifold 24b, is formed on a surface 20a of the third metal separator 20 facing the second membrane electrode assembly 16b. The second fuel gas channel 42 includes a plurality of wave-shaped channel grooves 42a (or linear channel grooves) that extend in the direction of arrow B.

A planar first buffer contact portion 44a, which is in contact with an inlet buffer portion 96a described below, is disposed at an inlet end of the second fuel gas channel 42. A planar second buffer contact portion 44b, which is in contact with an outlet buffer portion 96b described below, is disposed at an outlet end of the second fuel gas channel 42. In the first buffer contact portion 44a, a plurality of supply holes 46a are formed in the vicinity of the fuel gas inlet manifold 24a. In the second buffer contact portion 44b, a plurality of discharge holes 46b are formed in the vicinity of the fuel gas outlet manifold 24b.

A first sealing member 48 is integrally formed on the surfaces 14a and 14b of the first metal separator 14 so as to surround the outer peripheral end portion of the first metal separator 14. A second sealing member 50 is integrally formed on the surfaces 18a and 18b of the second metal separator 18 so as to surround the outer peripheral end portion of the second metal separator 18. A third sealing member 52 is integrally formed on the surfaces 20a and 20b of the third metal separator 20 so as to surround the outer peripheral end portion of the third metal separator 20.

The first, second, and third sealing members 48, 50, and 52 are each made of an elastic material, such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

Figure 2:
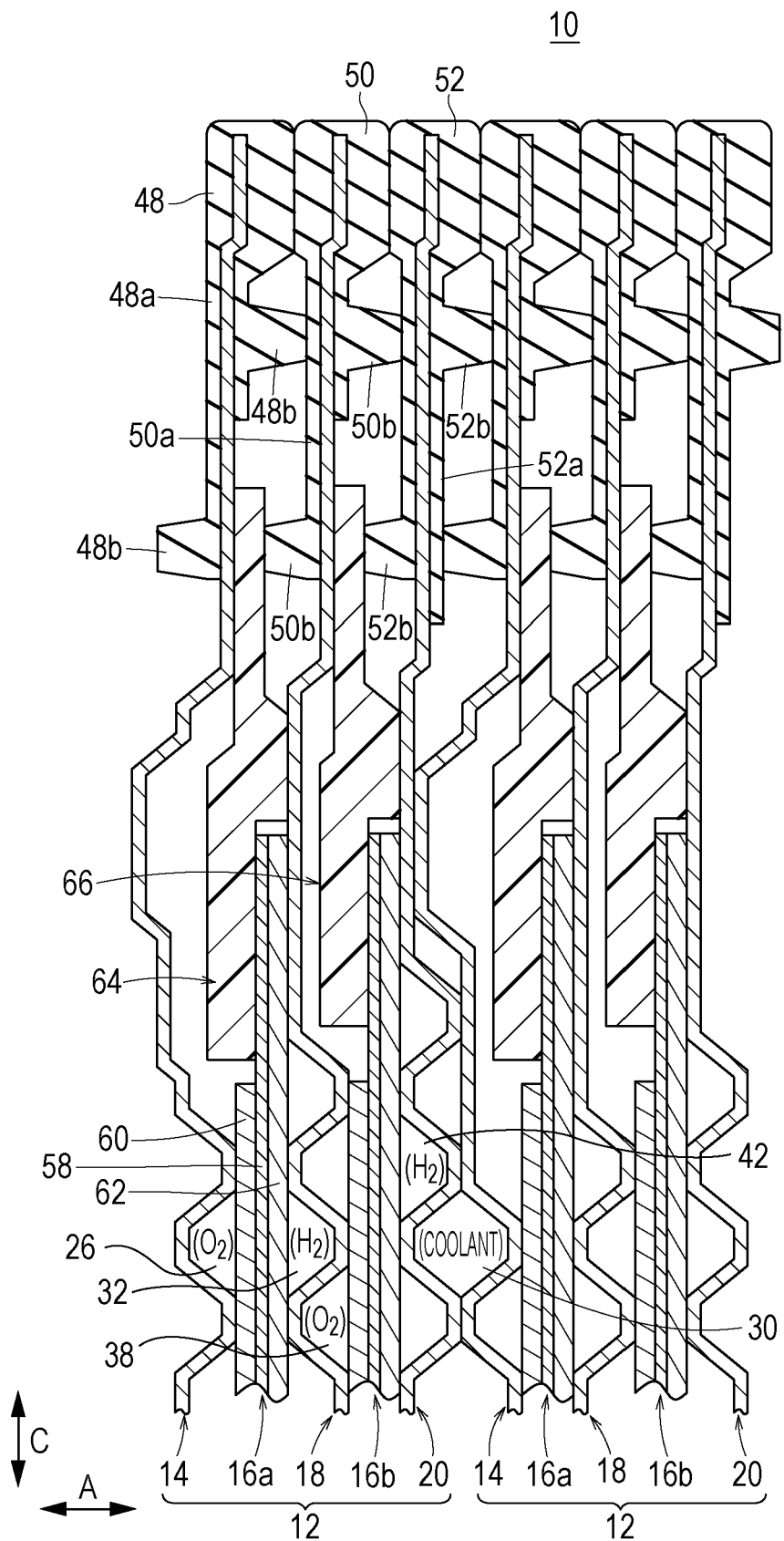
FIG. 2 is a sectional view of the power generation unit taken along line II-II in FIG. 1.

Referring to FIG. 2, the first sealing member 48 includes a planar seal portion 48a, which extends along a separator surface and has a uniform thickness, and a protruding seal portion 48b, which prevents leakage of the oxidant gas, the fuel gas, and the coolant.

Referring to FIG. 6, the first sealing member 48 includes a plurality of protruding portions 48pa, which are disposed near the oxidant gas inlet manifold 22a. A plurality of inlet paths 54a are formed between the protruding portions 48pa. An inlet flat portion 55a, which is in contact with an inlet connection channel portion 68a described below, is formed near the plurality of protruding portions 48pa. The first sealing member 48 includes a plurality of protruding portions 48pb, which are disposed near the oxidant gas outlet manifold 22b. A plurality of inlet paths 54b are formed between the protruding portions 48pb. An outlet flat portion 55b, which is in contact with an outlet connection channel portion 68b described below, is formed near the plurality of protruding portions 48pb.

Referring to FIG. 2, the second sealing member 50 includes a planar seal portion 50a, which extends along a separator surface and has a uniform thickness, and a protruding seal portion 50b, which prevents leakage of the oxidant gas, the fuel gas, and the coolant.

Referring to FIG. 7, the second sealing member 50 includes a plurality of protruding portions 50pa, which are disposed near the oxidant gas inlet manifold 22a. A plurality of inlet paths 56a are formed between the protruding portions 50pa. An inlet flat portion 57a, which is in contact with an inlet connection channel portion 82a described below, is formed near the plurality of protruding portions 50pa. The second sealing member 50 includes a plurality of protruding portions 50pb, which are disposed near the oxidant gas outlet manifold 22b. A plurality of outlet paths 56b are formed between the protruding portions 50pb. An outlet flat portion 57b, which is in contact with an outlet connection channel portion 82b described below, is formed near the plurality of protruding portions 50pb. Referring to FIGS. 6 and 7, the protruding portions 50pa and 50pb are longer than the protruding portions 48pa and 48pb.

Referring to FIG. 2, each of the first membrane electrode assembly 16a and the second membrane electrode assembly 16b includes a solid polymer electrolyte membrane 58 (cation-exchange membrane). The solid polymer electrolyte membrane 58 is, for example, a thin film that is made of perfluorosulfonic acid copolymers and soaked with water. The solid polymer electrolyte membrane 58 is sandwiched between a cathode electrode 60 and an anode electrode 62. Each of the first and second membrane electrode assemblies 16a and 16b is a so-called stepped MEA, in which the cathode electrode 60 has a size in plan view smaller than that of each of the anode electrode 62 and the solid polymer electrolyte membrane 58.

Alternatively, the cathode electrode 60, the anode electrode 62, and the solid polymer electrolyte membrane 58 may have the same size in plan view. Further alternatively, the anode electrode 62 may have a size in plan view that is smaller than that of each of the cathode electrode 60 and the solid polymer electrolyte membrane 58.

The cathode electrode 60 and the anode electrode 62 each include a gas diffusion layer (not shown) and an electrode catalyst layer (not shown). The gas diffusion layer is made of carbon paper or the like. The electrode catalyst layer is formed by uniformly coating a surface of the gas diffusion layer with porous carbon particles whose surfaces support a platinum alloy. The electrode catalyst layers are disposed on both sides of the solid polymer electrolyte membrane 58.

Referring to FIGS. 1 to 4, in the first membrane electrode assembly 16a, a first resin frame member 64 is disposed on an outer peripheral portion of the solid polymer electrolyte membrane 58 so as to be located outward from an edge of the cathode electrode 60. The first resin frame member 64 is integrally formed, for example, by injection molding. Alternatively, a resin frame member that has been manufactured beforehand may be joined to the outer peripheral portion.

In the second membrane electrode assembly 16b, a second resin frame member 66 is disposed on an outer peripheral portion of the solid polymer electrolyte membrane 58 so as to be located outward from an edge of the cathode electrode 60. The second resin frame member 66 is integrally formed, for example, by injection molding. Alternatively, a resin frame member that has been manufactured beforehand may be joined to the outer peripheral portion.

A commodity plastic, an engineering plastic, a super engineering plastic, or the like may be used as the material of the first resin frame member 64 and the second resin frame member 66.

Figure 3:
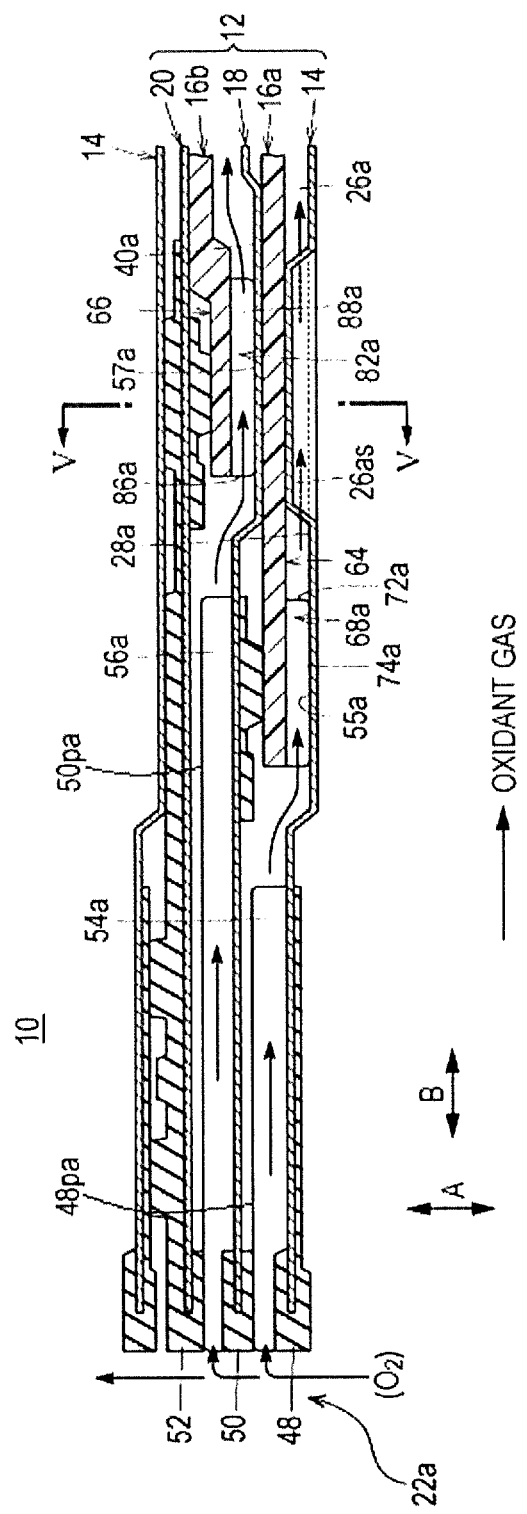
FIG. 3 is a sectional view of the power generation unit taken along line III-III in FIG. 1.
Figure 8:
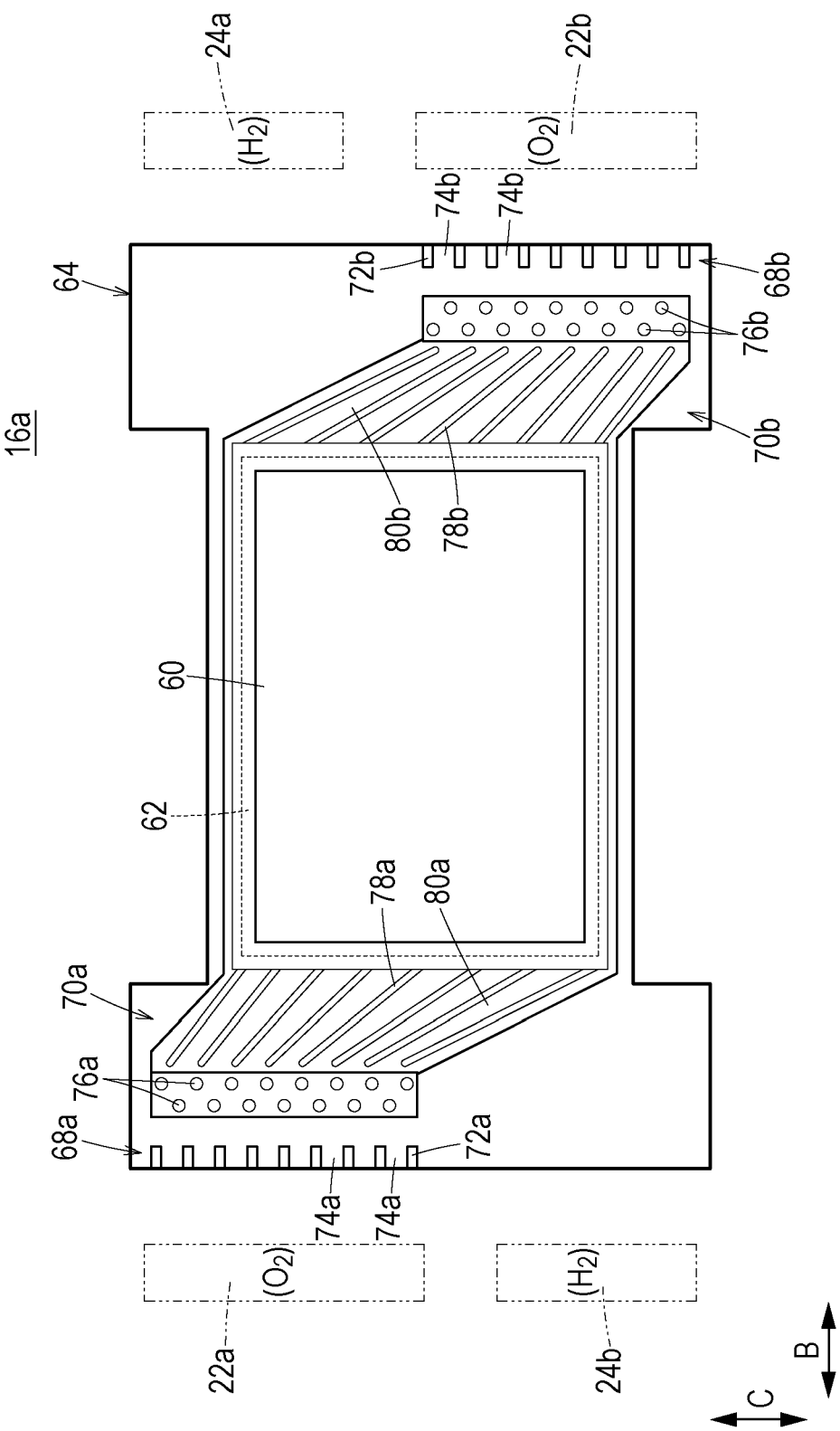
FIG. 8 is a plan view of a first membrane electrode assembly of the power generation unit.

Referring to FIGS. 1 and 8, on a surface of the first resin frame member 64 on the cathode electrode 60 side, the inlet connection channel portion 68a and the inlet buffer portion 70a are disposed between the oxidant gas inlet manifold 22a and an inlet of the first oxidant gas channel 26. The inlet connection channel portion 68a is disposed adjacent to the oxidant gas inlet manifold 22a and includes a plurality of protrusions 72a that have ends at one short side of the first resin frame member 64. The protrusions 72a extend from the oxidant gas inlet manifold 22a toward the inlet buffer portion 70a. Referring to FIG. 3, the protrusions 72a are in contact with the inlet flat portion 55a of the first metal separator 14. Inlet connection channels 74a are formed between the protrusions 72a.

Referring to FIG. 8, the inlet buffer portion 70a is disposed between the inlet connection channel portion 68a and the first oxidant gas channel 26. The inlet buffer portion 70a includes a plurality of embossed portions 76a near the inlet connection channel portion 68a and a plurality of bar-shaped protrusions 78a near the first oxidant gas channel 26. A plurality of linear paths 80a are formed between the bar-shaped protrusions 78a. The inlet buffer portion 70a may include only the embossed portion 76a or only the bar-shaped protrusions 78a. Inlet buffer portions and outlet buffer portions described below have structures similar to those described above.

Figure 4:
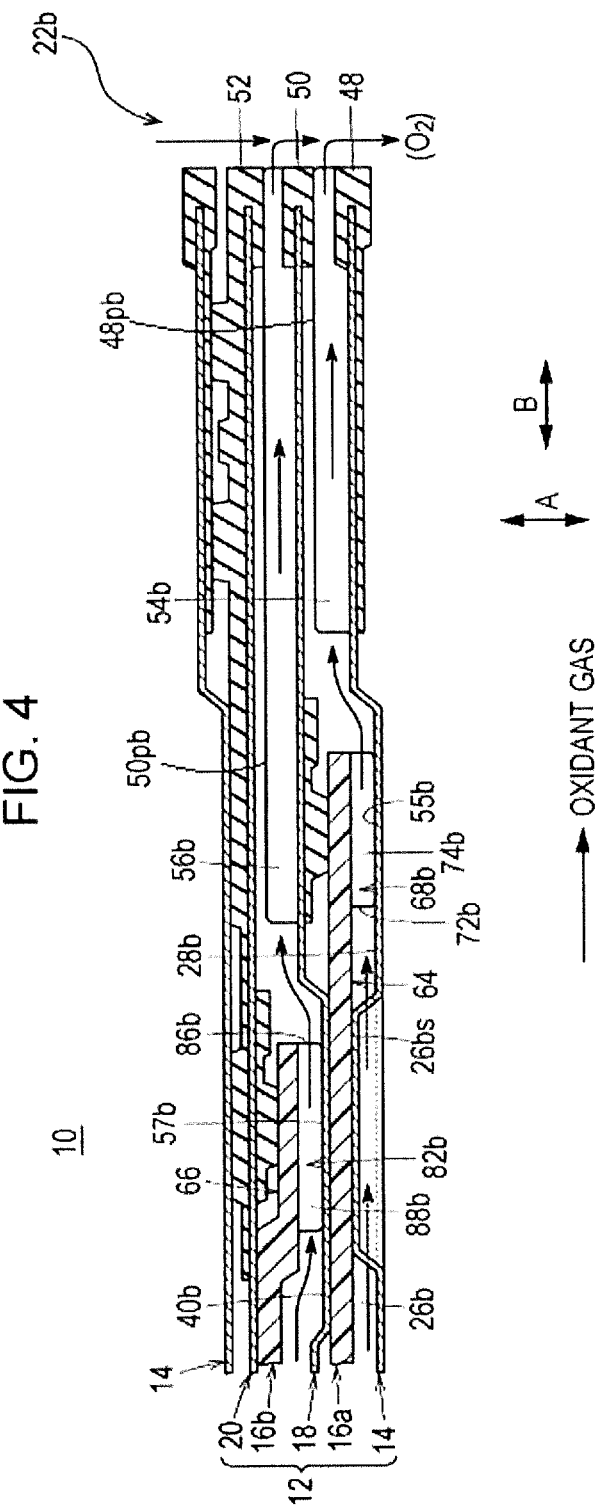
FIG. 4 is a sectional view of the power generation unit taken along line IV-IV in FIG. 1.

On a surface of the first resin frame member 64 on the cathode electrode 60 side, the outlet connection channel portion 68b and the outlet buffer portion 70b are disposed between the oxidant gas outlet manifold 22b and the outlet of the first oxidant gas channel 26. The outlet connection channel portion 68b is disposed adjacent to the oxidant gas outlet manifold 22b and includes a plurality of protrusions 72b that have ends at the other short side of the first resin frame member 64. The protrusions 72b extend from the oxidant gas outlet manifold 22b toward the outlet buffer portion 70b. Referring to FIG. 4, the protrusions 72b are in contact with the outlet flat portion 55b of the first metal separator 14. Outlet connection channels 74b are formed between the protrusions 72b.

Referring to FIG. 8, the outlet buffer portion 70b is disposed between the outlet connection channel portion 68b and the first oxidant gas channel 26. The outlet buffer portion 70b includes a plurality of embossed portions 76b near the outlet connection channel portion 68b and a plurality of bar-shaped protrusions 78b near the first oxidant gas channel 26. A plurality of linear paths 80b are formed between the bar-shaped protrusions 78b.

Referring to FIG. 1, on a surface of the first resin frame member 64 on the anode electrode 62 side, the inlet buffer portion 81a is disposed between the fuel gas inlet manifold 24a and the first fuel gas channel 32. The outlet buffer portion 81b is disposed between the fuel gas outlet manifold 24b and the first fuel gas channel 32. Detailed descriptions of the inlet buffer portion 81a and the outlet buffer portion 81b, which respectively have structures similar to those of the inlet buffer portion 70a and the outlet buffer portion 70b, are omitted.

Figure 9:
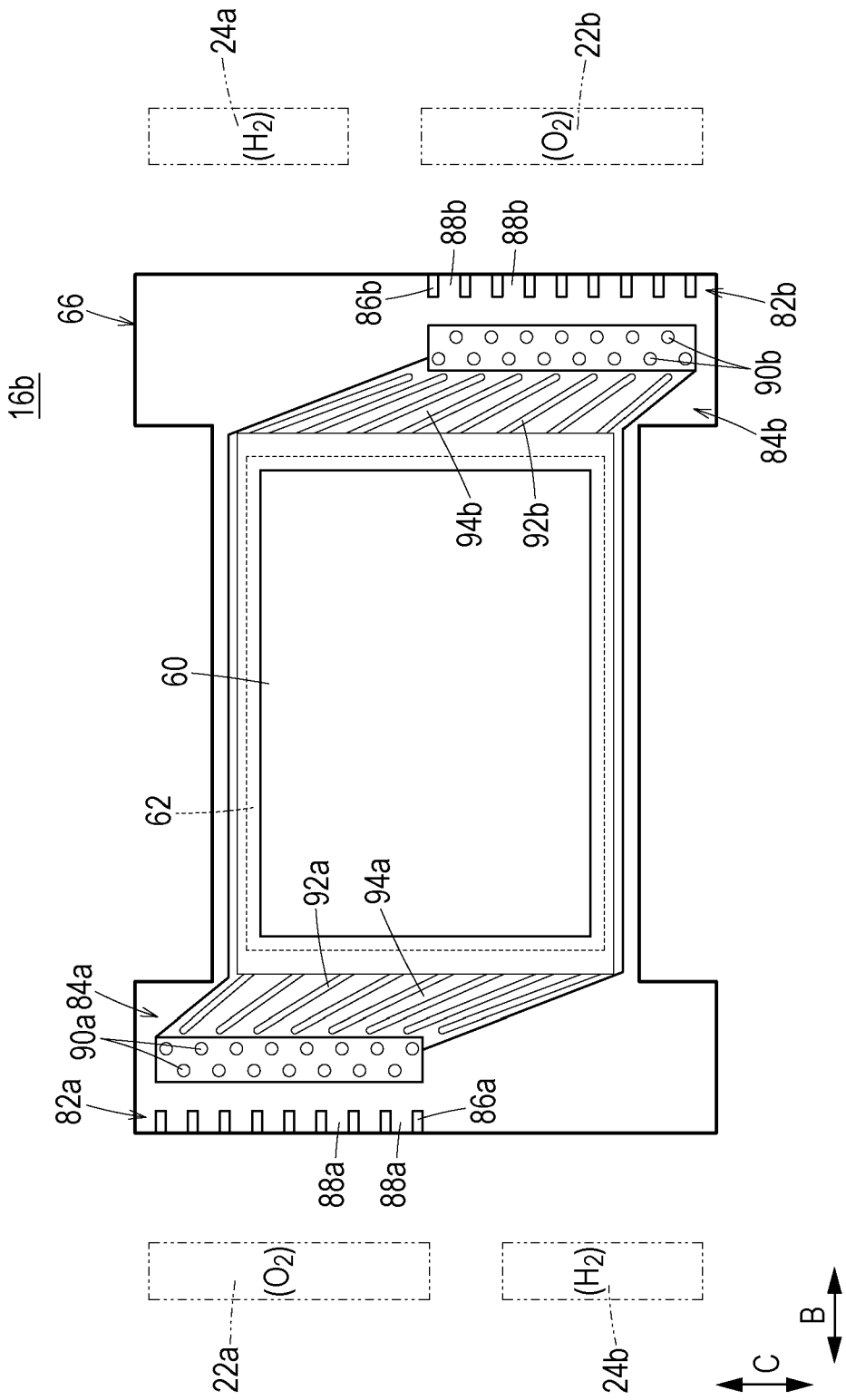
FIG. 9 is a plan view of a second membrane electrode assembly of the power generation unit.

Referring to FIGS. 1 and 9, on a surface of the second resin frame member 66 on the cathode electrode 60 side, the inlet connection channel portion 82a and the inlet buffer portion 84a are disposed between the oxidant gas inlet manifold 22a and the second oxidant gas channel 38. The inlet connection channel portion 82a is disposed adjacent to the oxidant gas inlet manifold 22a and includes a plurality of protrusions 86a that have ends at one short side of the second resin frame member 66. The protrusions 86a extend from the oxidant gas inlet manifold 22a toward the inlet buffer portion 84a. Referring to FIG. 3, the protrusions 86a are in contact with the inlet flat portion 57a of the second metal separator 18. Inlet connection channels 88a are formed between the protrusions 86a.

Figure 5:
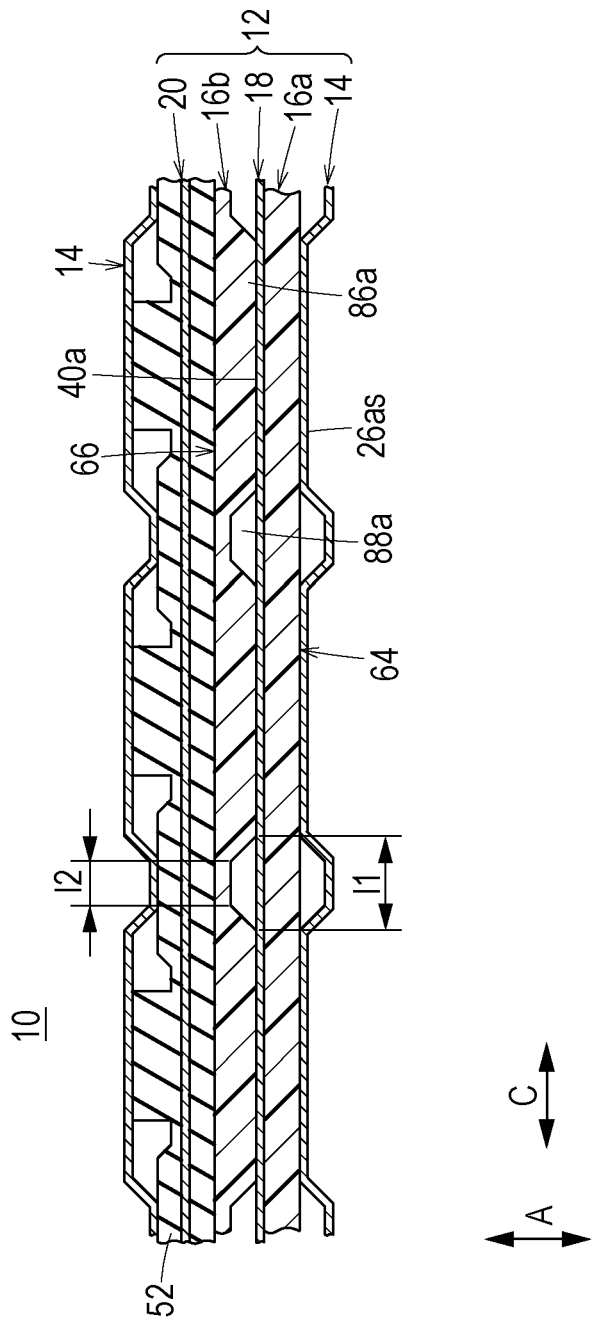
FIG. 5 is a sectional view of the power generation unit taken along line V-V in FIG. 3.

Referring to FIG. 5, the opening width l1 of each inlet connection channel 88a on an open end side that is adjacent to the second metal separator 18 is larger than the opening width l2 of the inlet connection channel 88a at a bottom side that is separated from the second metal separator 18 (l1>l2).

Referring to FIG. 9, the inlet buffer portion 84a is disposed between the inlet connection channel portion 82a and the second oxidant gas channel 38. The inlet buffer portion 84a includes a plurality of embossed portions 90a near the inlet connection channel portion 82a and a plurality of bar-shaped protrusions 92a near the second oxidant gas channel 38. A plurality of linear paths 94a are formed between the bar-shaped protrusions 92a.

On a surface of the second resin frame member 66 on the cathode electrode 60 side, the outlet connection channel portion 82b and the outlet buffer portion 84b are disposed between the oxidant gas outlet manifold 22b and an outlet of the second oxidant gas channel 38. The outlet connection channel portion 82b is disposed adjacent to the oxidant gas outlet manifold 22b and includes a plurality of protrusions 86b that have ends at the other short side of the second resin frame member 66. The protrusions 86b extend from the oxidant gas outlet manifold 22b toward the outlet buffer portion 84b. Referring to FIG. 4, the protrusions 86b are in contact with the outlet flat portion 57b of the second metal separator 18. Outlet connection channels 88b are formed between the protrusions 86b.

Referring to FIG. 9, the outlet buffer portion 84b is disposed between the outlet connection channel portion 82b and the second oxidant gas channel 38. The outlet buffer portion 84b includes a plurality of embossed portions 90b near the outlet connection channel portion 82b and a plurality of bar-shaped protrusions 92b near the second oxidant gas channel 38. A plurality of linear paths 94b are formed between the bar-shaped protrusions 92b.

Referring to FIG. 1, on a surface of the second resin frame member 66 on the anode electrode 62 side, the inlet buffer portion 96a is disposed between the fuel gas inlet manifold 24a and the second fuel gas channel 42. The outlet buffer portion 96b is disposed between the fuel gas outlet manifold 24b and the second fuel gas channel 42. Detailed descriptions of the inlet buffer portion 96a and the outlet buffer portion 96b, which respectively have structures similar to those of the inlet buffer portion 84a and the outlet buffer portion 84b, are omitted.

When two power generation units 12 are stacked on top of each other, the coolant channel 30 is formed between the first metal separator 14 of one of the power generation units 12 and the third metal separator 20 of the other power generation unit 12.

The operation of the fuel cell 10, which has the structure described above, will be described below.

First, referring to FIG. 1, an oxidant gas, such as an oxygen-containing gas, is supplied to the oxidant gas inlet manifold 22a. A fuel gas, such as a hydrogen-containing gas, is supplied to the fuel gas inlet manifold 24a. A coolant, such as pure water, ethylene glycol, or oil, is supplied to the pair of upper and lower coolant inlet manifolds 25a.

Therefore, referring to FIGS. 3 and 6, a part of the oxidant gas is introduced from the oxidant gas inlet manifold 22a of the first metal separator 14 into the inlet connection channel portion 68a through the inlet paths 54a. Referring to FIGS. 3, 6, and 8, in the inlet connection channel portion 68a, the oxidant gas flows to the inlet buffer portion 70a through a space between the inlet connection channels 74a and the inlet flat portion 55a. Then, the oxidant gas is supplied to the first oxidant gas channel 26 of the first metal separator 14 through the inlet buffer portion 70a.

Referring to FIGS. 3 and 7, the remaining part of the oxidant gas is introduced from the oxidant gas inlet manifold 22a of the second metal separator 18 into the inlet connection channel portion 82a through the inlet paths 56a. Referring to FIGS. 3, 7, and 9, in the inlet connection channel portion 82a, the oxidant gas flows to the inlet buffer portion 84a through a space between the inlet connection channels 88a and the inlet flat portion 57a. Then, the oxidant gas is supplied to the second oxidant gas channel 38 of the second metal separator 18 through the inlet buffer portion 84a.

Referring to FIG. 1, the part of the oxidant gas supplied to the first oxidant gas channel 26 flows along the first oxidant gas channel 26 in the direction of arrow B (horizontal direction), and is supplied to the cathode electrode 60 of the first membrane electrode assembly 16a. The remaining part of the oxidant gas flows along the second oxidant gas channel 38 in the direction of arrow B and is supplied to the cathode electrode 60 of the second membrane electrode assembly 16b.

A part of the fuel gas is supplied from the fuel gas inlet manifold 24a to the inlet buffer portion 81a through the supply holes 36a of the second metal separator 18. The part of the fuel gas is supplied to the first fuel gas channel 32 of the second metal separator 18 through the inlet buffer portion 81a.

The remaining part of the fuel gas is supplied from the fuel gas inlet manifold 24a to the inlet buffer portion 96a through the supply holes 46a of the third metal separator 20. The remaining part of the fuel gas is supplied to the second fuel gas channel 42 of the third metal separator 20 through the inlet buffer portion 96a.

The part of the fuel gas supplied to the first fuel gas channel 32 flows along the first fuel gas channel 32 in the direction of arrow B and is supplied to the anode electrode 62 of the first membrane electrode assembly 16a. The remaining part of the fuel gas flows along the second fuel gas channel 42 in the direction of arrow B and is supplied to the anode electrode 62 of the second membrane electrode assembly 16b.

Accordingly, in each of the first membrane electrode assembly 16a and the second membrane electrode assembly 16b, the oxidant gas supplied to the cathode electrode 60 and the fuel gas supplied to the anode electrode 62 are consumed in electrochemical reactions in the electrode catalyst layers, and therefore electric power is generated.

Referring to FIG. 1, the oxidant gas supplied to the cathode electrode 60 of the first membrane electrode assembly 16a and consumed, is introduced into the outlet buffer portion 70b of the first metal separator 14. Referring to FIGS. 4, 6, and 8, the oxidant gas flows from the outlet buffer portion 70b to the outlet connection channel portion 68b. In the outlet connection channel portion 68b, the oxidant gas is discharged to the oxidant gas outlet manifold 22b through a space between the outlet connection channels 74b and the outlet flat portion 55b.

Referring to FIG. 1, the oxidant gas supplied to the cathode electrode 60 of the second membrane electrode assembly 16b and consumed, is introduced into the outlet buffer portion 84b of the second metal separator 18. Referring to FIGS. 4, 7, and 9, the oxidant gas flows from the outlet buffer portion 84b to the outlet connection channel portion 82b. In the outlet connection channel portion 82b, the oxidant gas is discharged to the oxidant gas outlet manifold 22b through a space between the outlet connection channels 88b and the outlet flat portion 57b.

Referring to FIG. 1, the fuel gas, which has been supplied to the anode electrodes 62 of the first membrane electrode assembly 16a and the second membrane electrode assembly 16b and consumed, is introduced into the outlet buffer portions 81b and 96b. The fuel gas flows through the discharge holes 36b and 46b and is discharged to the fuel gas outlet manifold 24b.

The coolant, which has been supplied to the pair of upper and lower coolant inlet manifolds 25a, is introduced into the coolant channel 30. The coolant temporarily flows inward in the direction of arrow C, then flows in the direction of arrow B, and cools the first membrane electrode assembly 16a and the second membrane electrode assembly 16b. Then, the coolant flows outward in the direction of arrow C and is discharged to the pair of upper and lower coolant outlet manifolds 25b.

In the present embodiment, for example, referring to FIG. 8, on the surface of the first resin frame member 64 on the cathode electrode 60 side, the inlet connection channel portion 68a is disposed between the oxidant gas inlet manifold 22a and the inlet of the first oxidant gas channel 26. The inlet connection channel portion 68a includes the plurality of protrusions 72a, which form the inlet connection channels 74a.

Likewise, on the first resin frame member 64, the outlet connection channel portion 68b is disposed between the oxidant gas outlet manifold 22b and the outlet of the first oxidant gas channel 26. The outlet connection channel portion 68b includes the plurality of protrusions 72b, which form the outlet connection channels 74b.

Referring to FIGS. 3, 4, and 6, the first metal separator 14 includes the inlet flat portion 55a, with which the protrusions 72a are in contact, and the outlet flat portion 55b, with which the protrusions 72b are in contact. Therefore, it is not necessary to press-form the first metal separator 14 so as to form inlet connection channels and outlet connection channels. Accordingly, the shape of the first metal separator 14 is simplified and the first metal separator 14 can be easily press-formed, so that the first metal separator 14 can be made easily and economically.

Figure 10:
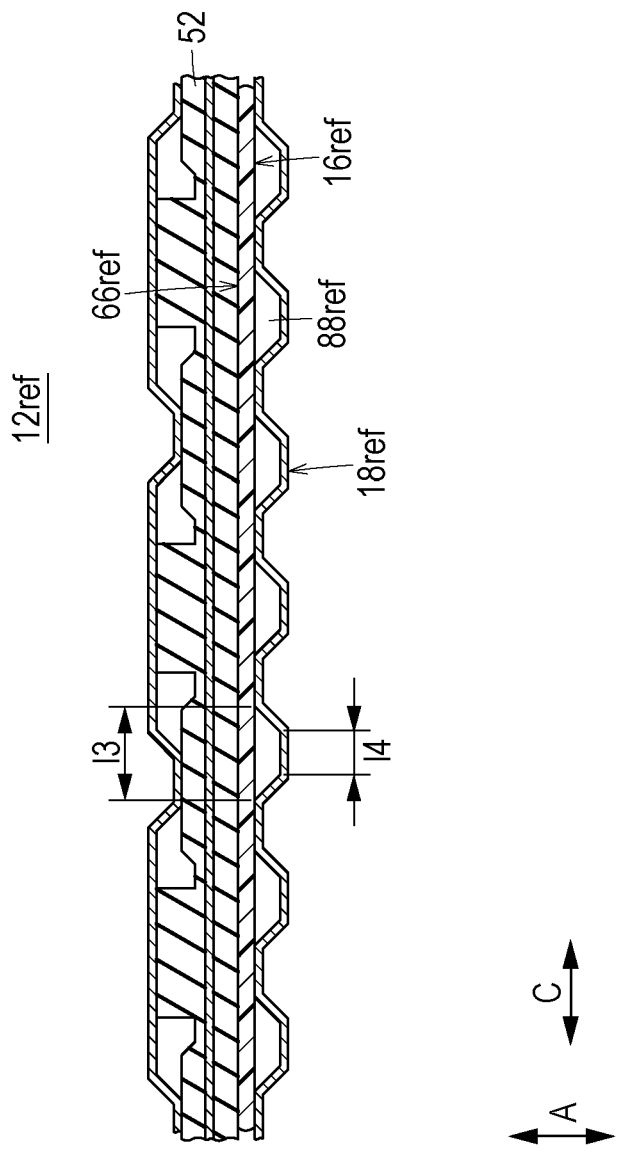
FIG. 10 is a sectional view of a power generation unit having an existing structure as a comparative example.

Moreover, the amount of deformation of the first resin frame member 64 can be considerably reduced as compared with the first metal separator 14, which is press-formed. To be specific, referring to FIG. 10, a power generation unit 12ref, having an existing structure, includes a metal separator 18ref, in which connection channels 88ref are press-formed. A resin frame member 66ref, which is disposed on an outer periphery of a membrane electrode assembly, may be formed by extending the outer periphery of a gas diffusion layer of an electrode. The resin frame member 66ref has a flat surface facing the connection channels 88ref.

The opening width l3 of the connection channel 88ref on the resin frame member 66ref side is larger than the opening width l4 of the connection channel 88ref on the bottom side that is separated from the resin frame member 66ref (l3>l4). Therefore, there is a problem in that the resin frame member 66ref is likely to become deformed so as to fall into the connection channels 88ref and therefore the connection channels 88ref might become blocked.

In contrast, according to the present disclosure, referring to FIG. 5, each inlet connection channel 88a is formed in the second resin frame member 66, and the opening width l1 of the inlet connection channel 88a on the open end side that is adjacent to the second metal separator 18 is larger than the opening width l2 of the inlet connection channel 88a on the bottom side that is separated from the second metal separator 18 (l1>l2). Accordingly, the second resin frame member 66 is not deformed easily, and blocking of the inlet connection channel 88a can be suppressed.

Thus, with the present disclosure, the gas sealing ability and the gas distributing ability of the inlet connection channel portion 68a and the outlet connection channel portion 68b can be significantly improved.

Moreover, with the second resin frame member 66 and the second metal separator 18, advantages the same as those of the first resin frame member 64 and the first metal separator 14 can be obtained. In the above description, the present embodiment is used only on the anode side. However this is not a limitation, and the present embodiment can be easily applied also to the cathode side.

Figure 11:
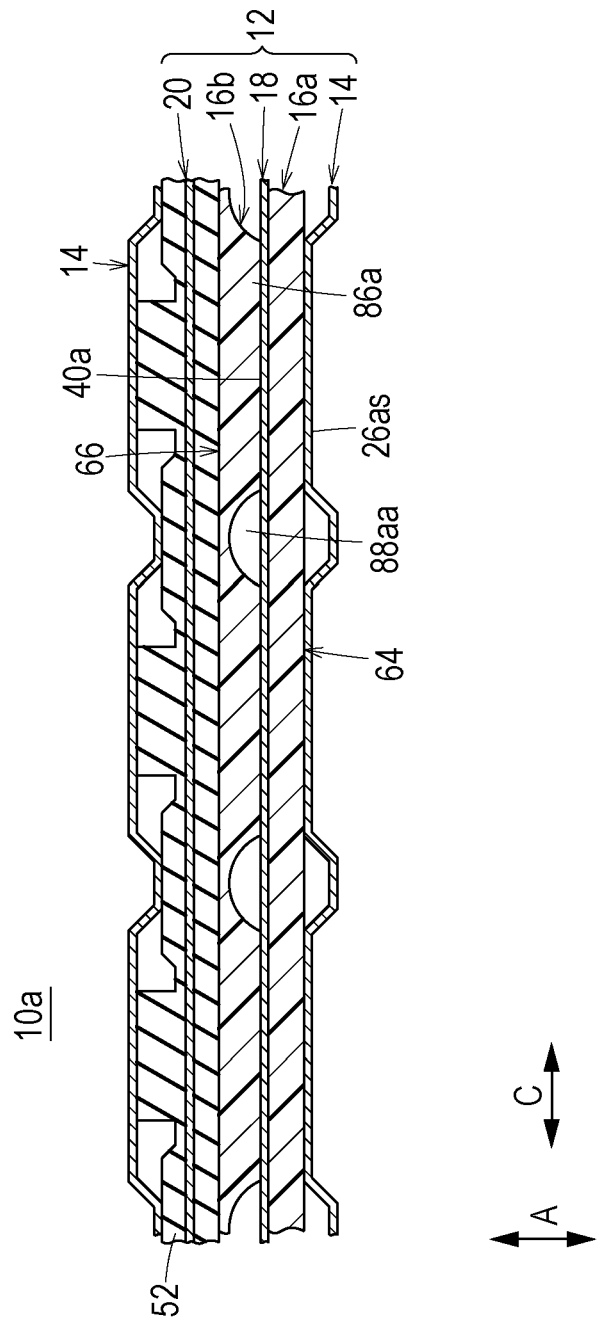
FIG. 11 illustrates another shape of an inlet connection channel.

In the present disclosure, referring to FIG. 5, the cross-sectional shape of each inlet connection channel 88a is trapezoidal. However, this is not a limitation. For example, as in a fuel cell 10a shown in FIG. 11, inlet connection channels 88aa, each having a semicircular cross-sectional shape, may be used. Likewise, other connection channels may have semicircular cross-sectional shapes or various other shapes.

In the present embodiment, each power generation unit 12 of the fuel cell 10 is a so-called thinned-out cooling fuel cell, which includes three separators and two MEAs. However, this is not a limitation. For example, the fuel cell may be an independent cooling fuel cell, in which one MEA is sandwiched between two separators.

A fuel cell according to the present disclosure includes a membrane electrode assembly including an electrolyte membrane and a pair of electrodes sandwiching the electrolyte membrane therebetween, and a metal separator stacked on the membrane electrode assembly. The metal separator includes a reactant gas channel through which a reactant gas is supplied along an electrode surface and a reactant gas manifold through which the reactant gas flows in a stacking direction in which the membrane electrode assembly and the metal separator are stacked. The membrane electrode assembly includes a resin frame member on an outer peripheral portion thereof.

The resin frame member has an outer shape such that the resin frame member is disposed further inward than the reactant gas manifold. The resin frame member includes a connection channel portion that is disposed outward from the electrode surface and that connects the reactant gas manifold and the reactant gas channel to each other. The metal separator includes a flat portion that is in contact with the connection channel portion.

Preferably, in the fuel cell, the connection channel portion of the resin frame member includes a plurality of protrusions that are disposed adjacent to the reactant gas manifold, and a connection channel is formed between the protrusions.

Preferably, in the fuel cell, a buffer portion is disposed between the connection channel portion and the reactant gas channel, the buffer portion including at least one of an embossed portion and a plurality of bar-shaped protrusions.

Preferably, in the fuel cell, an opening width of the connection channel portion on an open end side that is adjacent to the metal separator is larger than an opening width of the connection channel on a bottom side that is separated from the metal separator.

According to the present disclosure, the resin frame member includes the connection channel portion that connects the reactant gas manifold and the reactant gas channel to each other, and the metal separator includes a flat portion that is in contact with the connection channel portion. Therefore, the shape of the metal separator is simplified and the metal separator can be easily press-formed, so that the operation of manufacturing the metal separator can be simplified.

Moreover, the amount of deformation of the resin frame member is considerably smaller than that of the metal separator, which is made by press-forming. Accordingly, the cross-sectional area of the connection channel does not change, and the gas sealing ability and the gas distributing ability can be significantly improved.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
   a membrane electrode assembly including an electrolyte membrane and a pair of electrodes sandwiching the electrolyte membrane therebetween; and
   a first metal separator stacked on a first side of the membrane electrode assembly,
   a second metal separator stacked on a second side of the membrane electrode assembly,
   wherein the first metal separator includes a reactant gas channel through which a reactant gas is supplied along an electrode surface and a reactant gas manifold through which the reactant gas flows in a stacking direction in which the first metal separator, the membrane electrode assembly and the second metal separator are stacked,
   wherein the membrane electrode assembly includes a resin frame member on an outer peripheral portion thereof,
   wherein the resin frame member has an outer shape such that the resin frame member is disposed further inward than the reactant gas manifold in a direction perpendicular to the stacking direction,
   wherein the resin frame member includes:
      a buffer portion, and
      a connection channel portion that is disposed outward from the electrode surface and that connects the reactant gas manifold and the reactant gas channel to each other, the connection channel portion being disposed between the buffer portion and the reactant gas manifold, the connection channel portion is formed by a plurality of protrusions extending between the reactant gas manifold and the buffer portion, the plurality of protrusions of the connection channel portion extend to an outermost periphery of the resin frame member when viewed in the stacking direction,
   wherein the first metal separator includes a flat portion that is in contact with the connection channel portion, and
   wherein paths are provided in connection with the connection channel portion, the paths being provided between the first metal separator and the second metal separator in the stacking direction, the paths being formed between protruding portions of a sealing member, the paths being provided outward of the resin frame member in the direction perpendicular to the stacking direction, the paths extending toward the reactant gas manifold.

2. The fuel cell according to claim 1,
   wherein the plurality of protrusions are disposed adjacent to the reactant gas manifold, and a connection channel is formed between the protrusions.

3. The fuel cell according to claim 1,
   wherein the buffer portion is disposed between the connection channel portion and the reactant gas channel, the buffer portion including at least one of an embossed portion and a plurality of bar-shaped protrusions.

4. The fuel cell according to claim 2,
   wherein an opening width of the connection channel on an open end side that is adjacent to the first metal separator is larger than an opening width of the connection channel on a bottom side that is separated from the first metal separator.

5. The fuel cell according to claim 1,
wherein the plurality of protrusions are disposed adjacent to the reactant gas manifold,
wherein a connection channel is provided between the protrusions, and
wherein the plurality of protrusions of the connection channel portion extend from an outer peripheral end of the resin frame member toward the electrode surface.

6. The fuel cell according to claim 1,
wherein the buffer portion includes a plurality of embossed portions, and
wherein a region of contact between the flat portion of the first metal separator and the connection channel portion is formed at the plurality of protrusions disposed outward of an entirety of each of the embossed portions.

7. The fuel cell according to claim 1,
wherein the plurality of protrusions are elongated in a direction that extends from the reactant gas manifold toward the buffer portion.

8. A fuel cell comprising:
a membrane electrode assembly comprising:
  an electrolyte membrane;
  first and second electrodes which sandwich the electrolyte membrane between the first and second electrodes; and
  a resin frame member provided on an outer peripheral portion of the membrane electrode assembly, the resin frame member including:
    a buffer portion; and
    a connection channel portion;
a first metal separator stacked on a first side of the membrane electrode assembly in a stacking direction and comprising:
  a reactant gas channel through which a reactant gas is supplied along an electrode surface of the membrane electrode assembly;
  a reactant gas manifold through which the reactant gas flows in the stacking direction, the resin frame member of the membrane electrode assembly having an outer shape disposed further inward than the reactant gas manifold in a direction perpendicular to the stacking direction, the connection channel portion being disposed outward from the electrode surface and connecting the reactant gas manifold and the reactant gas channel to each other, the connection channel portion being disposed between the buffer portion and the reactant gas manifold, the connection channel portion is formed by a plurality of protrusions extending between the reactant gas manifold and the buffer portion; and
  a flat portion provided in contact with the connection channel portion; and
a second metal separator stacked on a second side of the membrane electrode assembly,
wherein the plurality of protrusions of the connection channel portion extend to an outermost periphery of the resin frame member when viewed in the stacking direction, and
wherein paths are provided in connection with the connection channel portion, the paths being provided between the first metal separator and the second metal separator in the stacking direction, the paths being formed between protruding portions of a sealing member, the paths being provided outward of the resin frame member in the direction perpendicular to the stacking direction, the paths extending toward the reactant gas manifold.

9. The fuel cell according to claim 8,
wherein the plurality of protrusions are disposed adjacent to the reactant gas manifold, and
wherein a connection channel is provided between the protrusions.

10. The fuel cell according to claim 8,
wherein a buffer portion is disposed between the connection channel portion and the reactant gas channel, the buffer portion including at least one of an embossed portion and a plurality of bar-shaped protrusions.

11. The fuel cell according to claim 9,
wherein an opening width of the connection channel on an open end side that is adjacent to the first metal separator is larger than an opening width of the connection channel on a bottom side that is separated from the first metal separator.

12. The fuel cell according to claim 9,
wherein the plurality of protrusions of the connection channel portion are in contact with the flat portion of the first metal separator.

13. The fuel cell according to claim 9,
wherein the plurality of protrusions of the connection channel portion extend from an outer peripheral end of the resin frame member toward the electrode surface.

14. The fuel cell according to claim 8,
wherein the buffer portion includes a plurality of embossed portions, and
wherein a region of contact between the flat portion of the first metal separator and the connection channel portion is formed at the plurality of protrusions disposed outward of an entirety of each of the embossed portions.

15. The fuel cell according to claim 8,
wherein the plurality of protrusions are elongated in a direction that extends from the reactant gas manifold toward the buffer portion.

* * * * *